3,266,348
BAR FEEDING DEVICE
Henri Mancia, Moutier, Bern, Switzerland, assignor to Usines Tornos, Fabrique de Machines Moutier S.A., Bern, Switzerland, a joint-stock company of Switzerland
Filed July 8, 1963, Ser. No. 293,466
Claims priority, application Switzerland, July 10, 1962, 8,305/62
4 Claims. (Cl. 82—2.5)

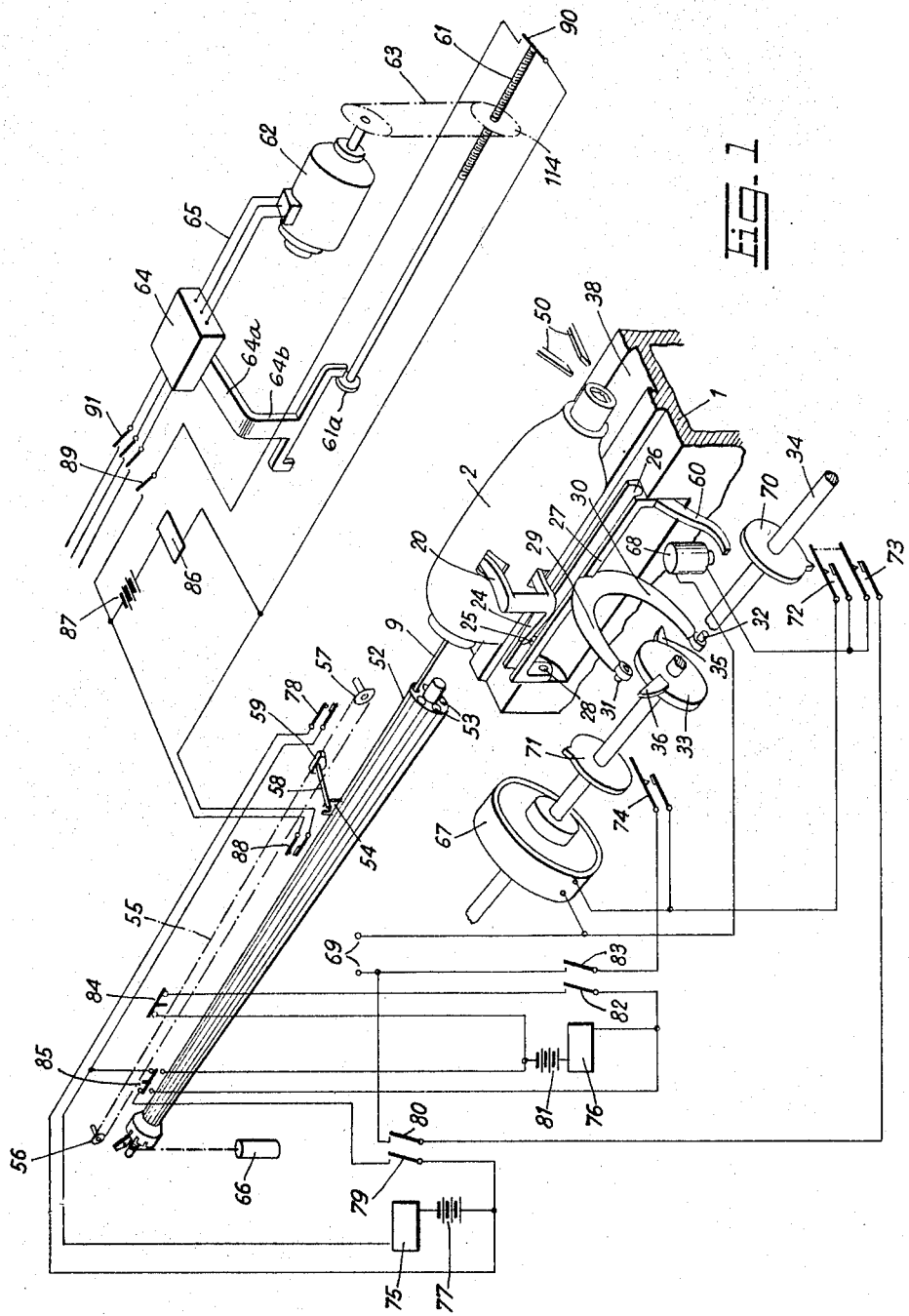

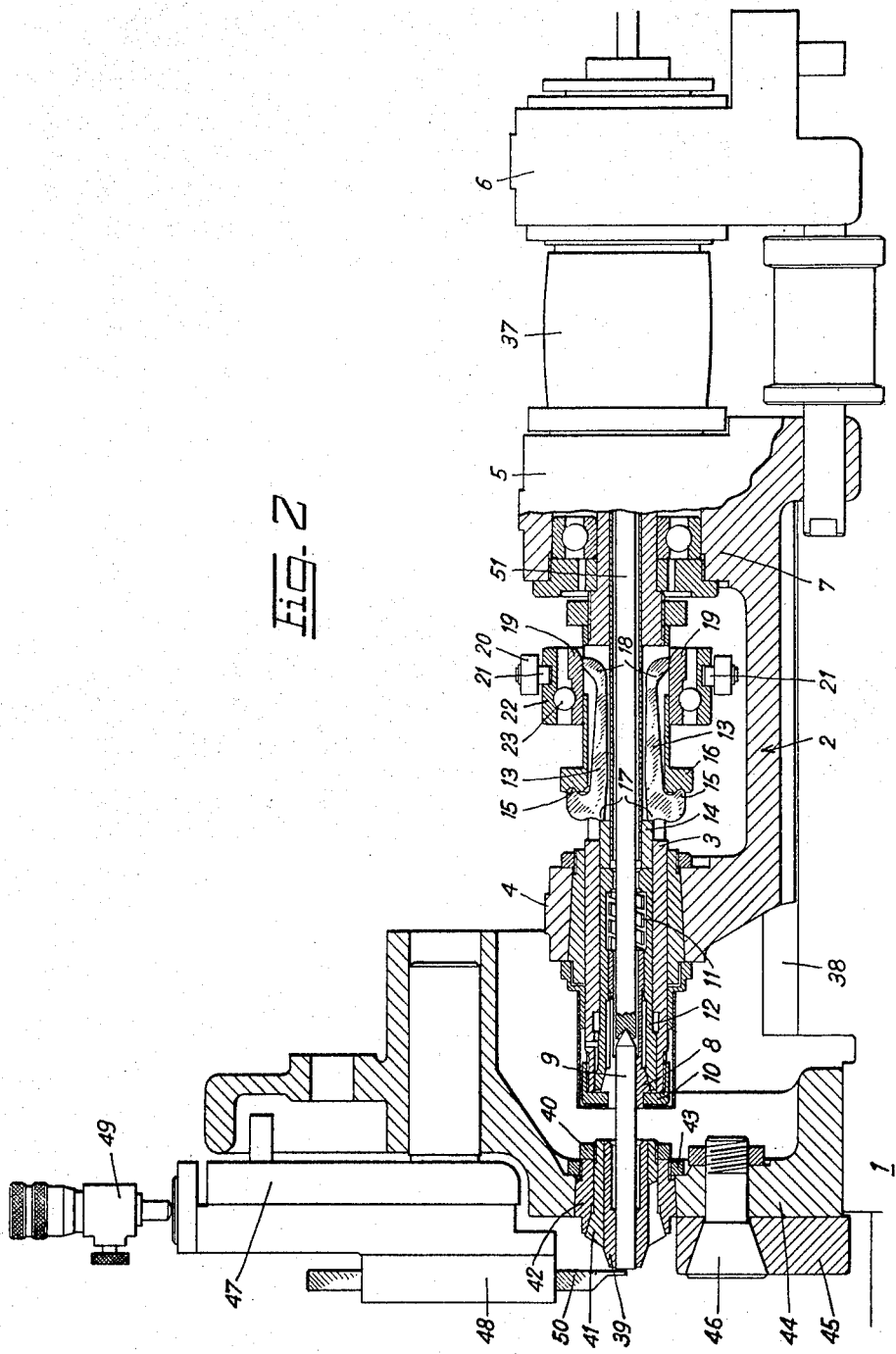

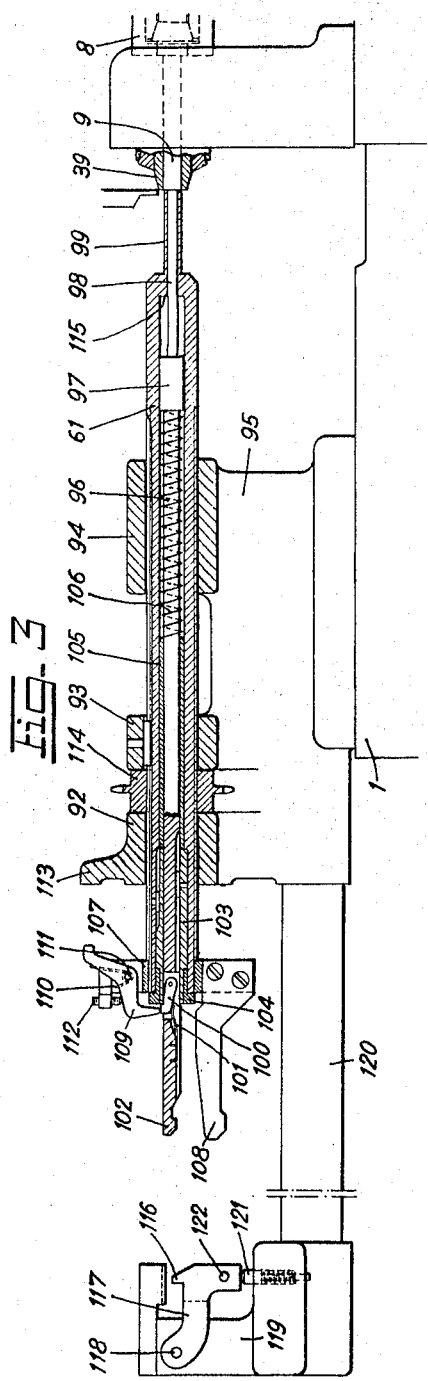
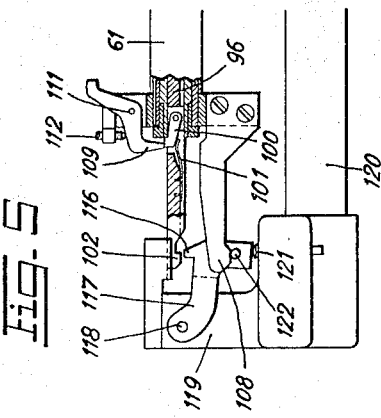
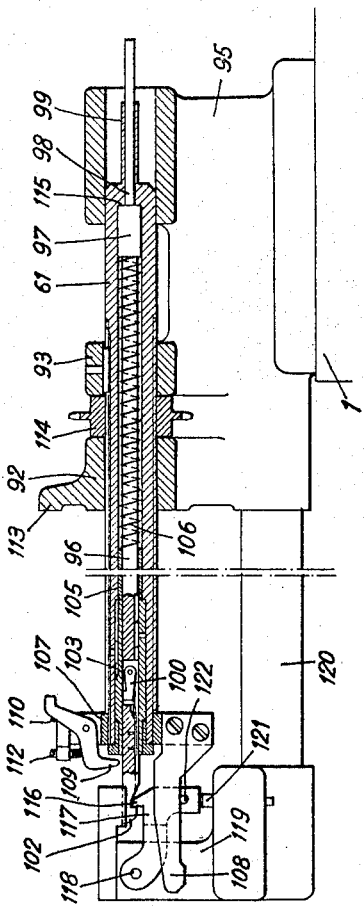

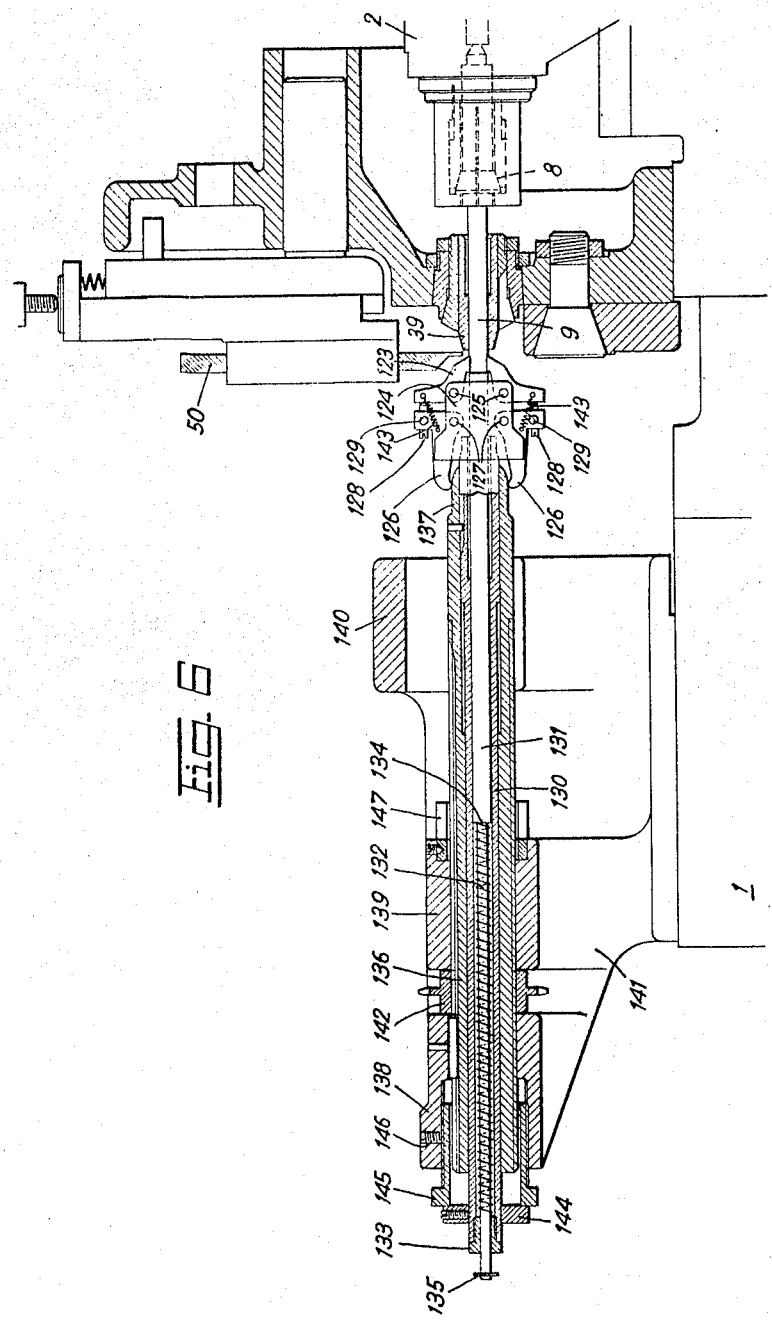

The present invention relates to feeding devices for automatic lathes which includes a sliding headstock and in which the tools, which are controlled in accordance with determined successive cycles of operation, machine successive workpieces from the end of a stock bar which is axially biased by means of a pusher in abutment against a severing tool while the headstock retracts backwardly with its stock bar chuck being in opened position after the termination of each machining cycle. The feeding devices contemplated herein, moreover comprise an extracting member for withdrawing from the spindle of the headstock the remnant of the bar that is unsuitable for further machining and a loader for automatically providing the headstock with a subsequent stock bar as soon as the remnant of the preceding bar has been evacuated.

In the heretofore known feeding devices of this type the extracting member is formed by the pusher itself, which is connected with the stock bar in such a manner that the bar may freely rotate during the machining operation but is pulled back by the pusher to the rear of the guiding device which is located behind the lathe when the pusher is displaced in that direction at the end of the machining operation.

While such heretofore known feeding devices may give satisfactory results with lathes of small capacity, they can very often not to be used in lathes of larger capacity. In such lathes, a very small clearance is usually provided between the outer diameter of the larger stock bars and the inner wall of the headstock spindle. Known pusher gripping devices are of the type which grip about the outer circumference of the tail end of the remnant end of the stock bar and withdraw it from the guiding sleeve (which is axially ahead of the sliding headstock) and backwards through the headstock. In smaller capacity lathes the guiding sleeve usually opens in order to permit easy withdrawal of the stock bar remnant piece; however, in larger capacity lathes the guiding sleeve does not open and, therefore, the pusher gripping device must be relatively sturdy in order to exert sufficient gripping force to withdraw the remnant piece from the guiding sleeve. It, therefore, results that in larger capacity lathes, the pusher gripping device is too large to be able to enter within the headstock spindle in order to grip the stock bar remnant, and, consequently, the machining of the stock bar must be terminated while the remnant is still long enough to have its rear end in close proximity to the spindle rear end so that the pusher gripping device may grip the remnant end without having to enter within the spindle. This means that there is considerable waste in that the remnant pieces are relatively long.

It is therefore an object of this invention to overcome such drawbacks of the heretofore known feeding devices by providing a control mechanism which comes into action at the very moment at which the pusher reaches its foremost position and ends its action when the new stock bar has been put in place, this mechanism controlling the following operations in successive sequence: Stopping the operations of the lathe at a moment of the cycle where none of the tools is positioned in the axial path of the stock bar and opening of the headstock chuck actuation of the extracting member; short re-starting of the operations of the lathe to complete the commenced cycle and restarting the normal operations when the loader has positioned a new stock bar.

The arrangement according to this invention provides that the axial path of the stock bar ahead of the headstock is unobstructed during the period when the remnant piece is to be removed from the headstock, so that an extracting member may grip the front end of the remnant piece (rather than the rear end) and extract said piece forwardly rather than rearwardly of the headstock. Further, according to the present arrangement, a severing tool is later brought into said axial path so as to serve as an axial limit means for the succeeding stock bar while this bar is being inserted forwardly through the headstock.

Other features and advantages of the invention will become apparent from the description now to follow, of two embodiments thereof, given by way of example only, and in which reference will be made to the accompanying partly diagrammatical drawings, in which:

FIG. 1 is a perspective general view of a first embodiment;

FIG. 2 is a part axial section through a lathe adapted to receive such feeding device;

FIG. 3 is a view partly in axial section and partly in elevation of some of the members of the feeding device of the first embodiment;

FIG. 4 is a view similar to that of FIG. 3 but showing the parts in another working position;

FIG. 5 illustrates some of the members of FIGS. 3 and 4 in a third working position;

FIG. 6 is a sectional view similar to that of FIG. 3 illustrating some of the parts of a second embodiment;

The feeding devices which shall be described hereinafter are adapted to be associated with an automatic lathe comprising a frame 1 (FIGS. 1 and 2) on which a headstock 2 is mounted for longitudinal sliding movement. The headstock 2, which is illustrated in more detail in FIG. 2, is of a well-known type. It comprises a spindle 3 mounted for rotation in bearings lodged in three supports 4, 5, 6 of the headstock frame 7. This spindle 3 comprises a chuck 8 adapted for rigidly gripping a stock bar 9 so as to drive the same in rotation and to move it axially. The chuck 8 is permanently loaded by a spring 11 so as to be axially pressed against a holding nut 10 secured to the spindle 3. The opening and closure of the chuck 8 is controlled by a sleeve 12 having a truncated conical inner surface at its forward end adapted to engage portions of a corresponding surface placed in the neighborhood of the free end of the jaws of the chuck 8. The axial displacements of the sleeve 12 opening and closing the chuck 8 are controlled by a pair of dogs 13 and by a sleeve 14. Each of the dogs 13 presents a rounded head 15 engaged in a recess of a seat 16 of the spindle 3 and about which the dog 13 may pivot. Each of the dogs 13 further presents a forward nose 17 and a rearward nose 18. The forward noses 17 are permanently in contact with the sleeve 14. The rearward noses 18 are submitted to the action of a control bushing 19 mounted for longitudinal sliding along the spindle 3. The axial displacements of the bushing 19 are in turn controlled by a stirrup 20 carrying pins 21 engaging openings of a ring 22 connected with the bushing 19 by a set of balls 22 forcing the bushing 19 to follow the axial movements imparted to the ring 22 by the stirrup 20, but leaving the bushing 19 free to rotate with the spindle 3 within the ring 22 which is held by the pins 21 of the stirrup 20.

In the position of the bushing 19 shown in FIG. 2, which is the forward position of this bushing, the noses 18 of the dogs 13 are maintained radially within the spindle 3 against the action of spring 11. In this position the noses 17 of the dogs 13 maintain the sleeve 12 engaged on the truncated conical surface portions of the jaws of the chuck 8. Thus the latter is closed. If the stirrup 20 displaces the ring 22 and consequently the bushing 19 forwardly, the noses 18 of the dogs 13 may move radially outwardly relative to the axis of the spindle 3 and thereby the dogs 13 may pivot about their heads 15. In this case the noses 17 of the dogs 13 are displaced backwardly and make possible for the spring 11 to retract the sleeve 12 removing it away from the chuck 8. The latter may then open under the action of its own elasticity.

From FIG. 1 it appears that the stirrup 20 is pivoted about a vertical axle and carries an arm 24 provided with a shoe 25 engaged in a longitudinal groove 26 of a tilting member 27 mounted on pins 28 in the frame 1 of the lathe for tilting motion about an axis parallel to that of the headstock. A pair of arms 29, 30 each carrying a follower 31, 32 respectively, are rigidly secured to the member 27.

It appears from this arrangement that tilting of the member 27 about the pins 28 produces a corresponding motion of the stirrup 20 about its vertical axle and consequently a longitudinal displacement of the ring 22 and of the control bushing 19. The tilting movements of the member 27 are in turn controlled by a cam 33 mounted on a shaft 34 carrying all further control cams of the lathe. The cam 33 carries a pair of ears 35, 36 adapted to engage the corresponding followers 31 and 32. When the ears 35, 36 are separated from the followers 31 and 32, the bridge 27 and the stirrup 20 remain stationary owing to the friction between the control bushing 19 and the spindle 3.

It results from the preceding that the ear 35 in lifting the arm 29 effects the opening, and the ear 36 in lowering the arm 30 effects the closing of the chuck 8 of the headstock 2.

The spindle 3 of the headstock 2 is driven in rotation by the main motor of the lathe (not shown) through a belt (not shown) driving in rotation a pulley 37 keyed on the spindle 3. As to the axial displacements of the headstock 2 along a slide 38 of the frame 1 these displacements are controlled in a well known manner by means not shown.

However, the stock bar 9 gripped by the chuck 8 of the headstock 2 is not held only by the latter in the field of action of the tools. The lathe comprises a guiding sleeve 39 in front of the headstock 2, which may be adjusted in accordance with the diameter of the stock bar 9 by a nut 40 affording for a tighter or looser gripping of a chuck 41 which is positioned within a sleeve 42 which in turn is secured by a nut 43 to a support 44 forming a part of the lathe frame. A yoke 45 carrying two precision cutting tools (not shown) is pivoted on the support 44 by a trunnion 46. The support 44 moreover carries adjustable slide rails 47. The latter are arranged fanwise and serve to guide tool holders in an approximately radial direction with respect to the guiding sleeve 39. The displacements of the tool-holders 48 are controlled from the cam-shaft 34 through overhead levers 49. The tools 50 carried by the tool-holders 48 have their working end situated in the immediate vicinity of the sleeve 39. In this manner the latter avoids deflection of the stock bar 9 under the action of the tools 50.

The tool 50 illustrated in FIG. 2 serves, among other purposes, to sever from the stock bar 9 the pieces which are completely machined, at the end of a machining cycle of the lathe. In the position illustrated in FIG. 2 the tool 50 has just terminated its severing action.

In addition to the radial tools 50 the lathe described may further comprise axial tools mounted on an auxiliary apparatus (not shown) which could be placed facing the headstock in front of the sleeve 39. In accordance with the number of the axial tools such auxiliary apparatus may comprise a slide, a yoke or a turrent head. The function of such auxiliary apparatus as well as those of the tools carried by such apparatus could be controlled by the camshaft 34 in such manner as to first bring the tool of the auxiliary apparatus which has to effect a machining operation into the axis of the headstock and then axially displace this tool in direction towards the workpiece that is machined. The tools adapted for use on such auxiliary apparatus are bits, drills, taps, die-heads or punches.

In the course of an operation cycle of the lathe the headstock 2 of the latter feeds the stock bar 9 progressively into the working region of the tools of the lathe. At the end of such an operation cycle the tool 50 illustrated in FIG. 2 is actuated for severing the machined workpiece from the bar 9 in the manner indicated above. When this tool 50 has effected its operation the ear 36 of the cam 33 rotates so as to lift the arm 29 secured to the tilting member 27 whereby member 27 is tilted about pins 28, this causing stirrup 20 to pivot about its vertical axis and thereby result in the opening of the chuck 8 of the headstock. Another cam (not shown) thereafter controls the backward motion of the headstock 2 along the slide 38 for about a distance corresponding to that of the length of one workpiece. During this backward motion of the headstock the stock bar 9 bears against the severing tool 50 under the action of a pusher 51. At the end of the backward movement of the headstock 2, the ear 35 of the rotating cam 33 pushes the arm 30 of the tilting member 27 downwardly thereby closing the chuck 8 of the headstock. A succeeding machining cycle may then start by first withdrawing the severing tool from the path of bar 9 and by feeding said bar forwardly through sleeve 39.

Since the stock bars machined on the lathe described have a length which is several times superior than that of the headstock 2, a guiding device is associated with such lathes. This device is placed behind the headstock of the lathe and serves to support that portion of the stock bar which projects beyond the rear end of the lathe headstock.

The guiding device represented in FIG. 1 comprises a drum 52 consisting of several tubes 53 each of which may serve as a support guide for a stock bar. A pusher rod 51 is slidably positioned in each of the tubes 53. In FIG. 1 only the pusher for the stock bar that is presently being machined has been represented. A plate 54 is carried out the rear end of each pusher rod 51, said plates each projecting radially outwardly from the corresponding tube 53 and being for the purpose of sliding the pusher rods 51 within their respective tubes 53. This sliding is effected by an endless chain 55 mounted on chain wheels 56, 57 respectively positioned above and adjacent to the rear and front ends of drum 52. Chain 55 is always driven in the same direction by a motor (not shown) which preferably is a motor having a great frequency drift and capable to support without damage even longer stops and to produce a constant torque so that the pusher 51 of the stock bar that is being machined bears against the rear end of the latter with a predetermined constant force. The pusher acting against the stock bar that is being machined is connected to the endless chain 55 by a link 58 jointed to a member 59 secured to the chain 55. Further the link 58 is provided with a known hooking device adapted to engage the plate 54 on the particular pusher 51 which is in axial alignment with the headstock 2. This hooking or engaging device for the link 58 is constructed in such manner as to drive the pusher forwardly when the member 59 is moved in this direction along the upper portion of chain 55, and rearwardly, when the member 59 is on the lower portion of the chain.

The length of the pusher rod 51 and the arrangement of the chain wheel 57 are such that when the member 59 reaches its forwardmost position, the remnant piece of stock bar which remains within guide sleeve 39 and spindle 3 is of a length which is too short for the production of a further workpiece therefrom. This condition is represented in FIG. 2, from which it appears that the rear end of the stock bar 9 has reached the inlet of the chuck 8 of the headstock. If at this moment the headstock were to move backwardly a distance about equal to the length of a workpiece the rear end of bar 9 would come out of chuck 8 and therefore no longer be rotatively driven or forwardly axially displaceable by headstock 2, these movements being necessary to the machining cycle.

In the condition of FIG. 2, it is therefore necessary to withdraw the remnant of the stock bar and to introduce a new bar into the headstock of the lathe.

This elimination of the bar remnant is effected by an extracting means which is described hereinafter with regard to three preferred embodiments, this extracting means constituting an essential feature of the present invention. The extracting means comprises an axially reciprocable member which is arranged in alignment with the axis of the headstock at the moment at which the bar remnant must be removed because it cannot be machined further. In the first embodiment to which FIG. 3 of the drawings refers, the extracting member is situated in front of sleeve 39. It may be carried by the auxiliary apparatus otherwise equipped with tools adapted to effect axial machining operations.

The extracting member of the first embodiment comprises a helical screw 61 having at least one thread. This screw 61 is displaced in axial direction by a motor 62 through a chain 63. A switch 64, connected into the supply leads 65 of the motor 62 may reverse the direction of rotation of the motor 62. This switch 64 is actuated in a well known manner by means controlled by the extracting member. In particular the latter actuates the switch 64 each time it arrives to the end of a stroke in the one or in the other direction. For example, the actuating mechanism may include a lever 64a carrying a fork 64b at its end remote from the switch, as shown in FIG. 1. The two legs of fork 64b embrace a nut 61a fixed onto screw 61. The distance between the two legs of fork 64b substantially corresponds to the stroke of screw 61. It is to be understood, of course, that other actuating mechanisms may be utilized in place of the above, such as for example, an electromagnetic apparatus.

During the time the bar remnant is removed by the extracting member, the member 59 passes around the chain wheel 57 and starts to move towards the rear of the drum 52 along the lower portion of the chain 55. During this time the link 58 also starts to pull the pusher to which it is connected in a direction towards the rear of the drum 52. As the member 59 reaches the neighborhood of the chain wheel 56 and turns around the latter, the hooking device of the link 58 is separated from the plate 54 of the pusher which has just been actuated and an indexing device is actuated by this member 59 so as to rotate the drum 52 one step under the action of a counterweight 66, so that the next following tube 53 is brought into alignment with the headstock 2. As the member 59 then moves forwardly again along the upper portion of the chain 55, the hooking device of the link 58 engages the plate of the pusher associated with the new tube 53 which has come into alignment with the headstock 2 and moves this pusher forwardly thereby feeding the new stock bar that has previously been introduced into said tube 53.

In order that the described lathe may start machining of pieces on the new bar that has been introduced it is necessary that the forward end of this new bar when it is put in place, has passed through the chuck 8 of the headstock 2 and through the guiding sleeve 39 and has reached the severing tool 50 represented in FIG. 2 which serves as an abutment or limit means for positioning the forward end of the stock bar at a common starting position for each successive machining cycle.

In order to ascertain the supply of the lathe under these conditions the feeding device in accordance with the first embodiment comprises an electrical control mechanism represented in FIG. 1. This mechanism comprises, on the one hand, an electro-magnetic clutch 67, which effects unclutching of cam shaft 34 and accordingly causes the latter as well as all functions of the lathe to stop, when it is excited, and, on the other hand, an electromagnet 68 acting on an arm 60 of the tilting member 27 and producing the opening of the chuck 8, when it is excited. The electro-magnetic clutch 67 and the electromagnet 68 may be supplied from a power supply (not shown) connected to the terminals 69. The control of the supply circuit of the clutch 67 and of the magnet 68 is effected, on the one hand, by two cams 70, 71 acting the first one upon a pair of associated contacts 72, 73, and the second one upon a contact 74, and, on the other hand by two relays 75, 76. To this end the relay 75, which may be supplied with current from a power source 77, comprises a control contact 78, a holding contact 79 and an operating contact 80. As to the relay 76, which may be supplied from a current source 81, it comprises a holding contact 82, a working contact 83 and a stop contact 84. Finally a double contact 85, the movable element of which is normally in the upper position as shown in FIG. 1 serves to release the relay 75 and to excite the relay 76 when the movable element is displaced downwardly.

Starting and stopping of the motor 62, are both controlled by a relay 86 which may be supplied with current from a source 87 and which comprises a control contact 88, a holding contact 89 and a stop contact 90 as well as a switch 91 connected into the supply leads 65 of the motor 62. At rest the screw 61 is in its position away from the headstock 2 and keeps the contact 90 open.

The details of the construction of the extracting member, which shall be described later on, are not necessary to the understanding of the operation of the control mechanism of the feeding device according to the first embodiment shown in FIG. 1. This operation is as follows:

When a stock bar 9 has been machined to an extent that the remaining rest is not adapted for further use, the member 59 closes contact 78, the position of which is selected so that member 59 actuates this contact during the machining of the last work piece at the end of the stock bar 9. As a matter of fact member 59 can advance and close the contact 78 only at the moment when the headstock 2 itself advances the forward end of the stock bar that is machined into the field of action of the tools and makes it possible, consequently, for the pusher rod 51 to advance forwardly behind the forwardly moving stock bar. The closure of contact 78 energizes relay 75 which thereby closes its holding contact 79 and its working contact 80. As the member 59 continues its forward motion, contact 78 is opened again, but the relay 75 remains momentarily excited because contacts 79 and 85 are closed and thereby complete the holding circuit of relay 75. Since contacts 72 and 73 are normally open, the closure of contact 80 does not of itself excite the clutch 67 and the magnet 68. This takes place only when the cam 70 closes contacts 72 and 73. The cam 70 is disposed around shaft 34 as to close the contacts 72 and 73 in a moment of the operation of the lathe, in which none of the tools of the latter is in the axial path of the stock bar 9. Moreover, if an auxiliary apparatus carrying one or more axially acting tools as well as the extracting member is provided which is adapted to face the lathe headstock, the moment of the cycle during which the contacts 72 and 73 are closed must coincide with the moment when the extracting member has been placed in alignment with the headstock. As soon as the contacts 72 and 73 have been closed by cam 70, clutch 67 is energized and thereby interrupts the driving engagement between the driving shaft and the driven cam shaft 34 so that all further machining operations of the lathe are discontinued. Pulley 37, however, continues to rotate since it is driven directly from the main motor of the lathe. The lubrication of the bearings of the spindle and particularly the working temperature of these bearings are thus not affected when the camshaft is at rest. As a result of the closure of the contacts 72 and 73 the electromagnet 68 is also excited so that the chuck 8 of the headstock is opened. During the period between the closure of contact 78 by the member 59 and the moment at which the cam 70 closes the contacts 72 and 73, the member 59 continues its stroke. More particularly it turns about the chain wheel 57 and starts to return towards the back of drum 52. During its rearward movement, member 59 causes control contacts 88 to close thereby energizing relay 86. This results in the closure of the switch 91 and in the starting of the motor 62. Thus the screw 61 starts to move towards the headstock 2 and the contact 90 is thereby closed. This contact closes the holding circuit of relay 86, which also comprises the holding contact 89 closed at the same time as the switch 91 was closed. The control contact 88 is arranged so as to be closed by the member 59 for a period long enough to permit screw 61 to advance an extent sufficient for it to close contact 90 before contact 88 opens by virtue of member 59 no longer maintaining contact 88 in closed condition. Screw 61 terminates its reciprocatory axial movement, which provides for the removal of the stock bar remnant as will be further described hereafter, while member 59 is moving rearwardy but before it reaches contact 85. During a first phase the screw is displaced towards the headstock of the lathe and actuates the switch 64. The latter reverses the direction of rotation of the motor 62 so that the screw 61 returns to its starting position in which it acts again upon switch 64 and also opens contact 90 thereby interrupting the holding circuit of relay 86. At this moment switch 91 is opened and the motor 62 is stopped. The removal of the bar remnant has been effected and the lathe is prepared to receive a new stock bar. Member 59 then slides against contact 85 and pushes the movable member thereof downwardly. This results in the interruption of the holding circuit of relay 75 and in the energization of relay 76. It results that the working contact 80 of relay 75 is opened and in that the holding contact 82 and the working contact 83 of relay 76 are closed. The opening of contact 80 results in interruption of the current supply to the electromagnetic clutch 67 and to the electromagnet 68. Thus the chuck 8 of the headstock is closed again and the camshaft 34 starts to rotate. However, the duration of this operation is rather short since the energization circuit for clutch 67 is again completed, through contact 83 which has been closed by relay 76, as soon as contact 74 is closed by cam 71 on cam shaft 34. Camshaft 34 is, therefore, stopped a second time which corresponds to the end of a complete cycle. When camshaft 34 is stopped the second time, which is at the end of an operation cycle, the severing tool is placed in the path of the stock bar and may consequently serve as abutment for the new bar that shall be placed in the lathe. Moreover, the chuck 8 of the headstock is opened and the latter prepared to move backward about the length of a workpiece or is already in its rearmost position in which the chuck 8 is ready to seize a new stock bar and to drive the same in rotation and to shift it axially forward. The lathe remains in this stopped position until member 59 has turned around chain-wheel 56 and has started forward movement again and reached the stop contact 84, the position of which is selected so that it is actuated by member 59 before the forward end of the new stock bar has abutted the severing tool which is in its path. The opening of contact 84 interrupts the holding circuit of relay 76. Relay 76 is a well known delayed action type relay so that its response to the opening of contact 84 is delayed a period sufficient to permit the new pusher rod 51 connected to member 59 by link 58 to feed the new stock bar to be machined into abutment with the severing tool. Also the contact 84 is arranged so as to be held open by member 59 during the delay period of relay 76. Thus contact 83 is opened only when the new stock bar is properly in place. When this opening of contact 83 occurs, the supply circuit for the clutch 67 is opened and the camshaft 34 starts to rotate. The machining operations of the lathe thus start immediately on the new stock bar. The cams 70 and 71 which periodically close the contacts 72 to 74 remain without effect on the clutch 67 and on the electromagnet 68 during all the time the lathe machines workpieces at the end of the new stock bar. These contacts will stop the camshaft 34 and open the chuck 8 only when the new stock bar will have been machined completely and member 59 will have reached contact 78.

The described lathe may thus work absolutely automatically as long as stock bars are in reserve in the tubes of the drum 52. For continuous operation of the lathe it is sufficient to ascertain uninterrupted feed of stock to drum 52. This supply may be effected through known means in one of the stations of drum 52 which is not that in alignment with the headstock.

The details of the construction of the extracting member of the first embodiment are illustrated in FIGS. 3 to 5, each of which illustrates a different working position. In FIG. 3 the screw 61 is formed by a tubular piece mounted in three bearings 92, 93, 94 of a support 95 mounted on the frame 1 of the lathe. This support 95 could also be constituted by the slide, the yoke or the turret of an auxiliary apparatus carrying one or several axial tools. In this case the support of the auxiliary apparatus could be controlled in known manner so as to successively bring each of the tools carried thereby as well as the screw 61 into alignment with the axis of the headstock during an operation cycle of the lathe. In the following description only the particulars of the extracting device shall be described. In addition to the tubular screw 61 this device further comprises a rod 96 coaxial to the screw 61. This rod 96 extends through the whole length of screw 61 and comprises a thicker portion 97 and a smaller diameter front portion 98 which is slidably mounted within the front end wall 99 of screw 61. The outer diameter of the wall 99 is slightly smaller than the opening of sleeve 39 so that it may enter the latter. Moreover, wall 99 is longer than the portion of sleeve 39 which supports and guides the stock bar 9 to be machined. At its rear end rod 96 carries a movable pawl 100 acted upon by a spring 101, and rod 96 also carries a hook 102. In the illustrated position the nose of pawl 100 is engaged behind the rear end of a sleeve 103 seated on rod 96 and extending within screw 61. A nut 104 holds sleeve 103 as well as a bushing 105 within screw 91. A loaded spring 106 is arranged between the forward end of bushing 105 and rod portion 97.

A support 107 is secured to the rear end of screw 61 and a stationary control nose 108 as well as a releasing lever 109 are mounted on the support 107. A spring 110 acts on lever 109 so that the latter, pivotally mounted about a pin 111, is normally maintained in contact with an adjusting screw 112 in the position illustrated in FIG. 3, in which the lower nose of lever 109 is ready to release the pawl 100. The upper nose of lever 109 is adapted to contact an abutment 113 on the bearing 92. The wheel 114 controlling the axial displacements of screw 61 is axially held between the bearings 92 and 93.

In the position represented in FIG. 3 wheel 114 is shown as it moves screw 61 in the direction towards the lathe headstock under the action of motor 62. In the course of this first phase of motion of screw 61 the right hand end of the thin wall 99 abuts the forward end of the remnant of the stock bar 9, which shall be removed from the headstock as waste. In the position shown in FIG. 3 the wheel 114 continues to move screw 61 to the right so that the wall 99 of screw 61 enters sleeve 39 and pushes the remnant of the stock bar 9 rearwardly out of this sleeve. When the forward end of bar 9 has left sleeve 39 the upper nose of lever 109 reaches the abutment 113. Lever 109 then pivots against the action of spring 110 and releases pawl 100 from the rear end of sleeve 103. At this moment rod 96 is released from screw 61 and is suddenly pushed forwardly by spring 106 until portion 97 abuts an inner shoulder 115 of screw 61. This sudden movement of rod 96 ejects the remnant of the stock bar 9 through the lathe headstock. Since the pusher, which had brought the stock bar 9 into the position shown in FIG. 3, has been withdrawn in the meantime, the path for the ejected waste end of the stock bar 9 through the headstock is entirely free. Thus, all that must be done is to select a spring 106 of sufficient strength that the impulse transmitted by rod 96 to the waste end of the bar 9 ejects the latter through the whole length of the headstock. Then the waste end of the bar 9 will drop into the free space at the rear end of the headstock between the latter and the drum 52.

As previously indicated, the screw 61 actuates, at the end of its stroke, the switch 64 and thereby reverses the direction of rotation of the motor 62. The wheel 114 will consequently withdraw screw 61 from sleeve 39 and displace it forwardly until it reaches the position illustrated in FIG. 4, in which hook 102 is engaged behind a nose 116 of a pawl 117. The latter is pivoted about a pin 118 on a support 119 secured to the end of a bracket 120. The pawl 117 is pushed upwardly by a spring-loaded piston 121 so that its nose 116 normally lockingly engages hook 102. As screw 61 has reached the position shown in FIG. 4 it again actuates switch 64 thereby reversing the direction of rotation of the motor 62 again. Simultaneously, screw 61 opens contact 90 stopping the motor 62.

The extracting device remains in the position of FIG. 4 during the whole period of the machining of the new stock bar until the moment where the motor 62 is started again by the relay 86 in the manner previously described. At this moment, the wheel 114 again displaces screw 61 to the rear end of the support 95. In the course of the first phase of the new displacement of screw 61, the rod 96 is first retained by pawl 117. Screw 61 is moved alone and loads the extracting spring 106. At a predetermined moment which is represented in FIG. 5 the pawl 100 comes out of the sleeve 103 and the spring 101 forces it back into its original position represented in FIG. 3 behind the rear end of sleeve 103. The stationary nose 108 then engages a pin 122 extending transversely to the pawl 117 and moves the latter against the action of the spring-loaded piston 121 so as to release hook 102. Rod 96 may then move together with screw 61 as appears from FIG. 3.

The described operation of the extracting device is rendered possible by the fact that at the moment where it is put into action, the tools of the lathe are stopped as is the camshaft 34, at a particular phase of the cycle of operation in which none of these tools is engaged in the path of the stock bar 9 and at which the chuck 8 of the headstock 2 is open.

The second embodiment of the feeding device according to the invention, represented in FIG. 6, differs from the first embodiment only by the construction of the extracting member. The control mechanism acting upon the camshaft of the lathe and upon the headstock chuck as well as upon the extracting member is the same as described in the first embodiment.

The extracting member of the second embodiment is constituted mainly by a gripper located at the same place as the extracting member of the first embodiment. This gripper is arranged for seizing the end of the bar 9 which remains in the headstock and in the guiding sleeve of the lathe and for evacuating the bar remnant through the front of the lathe. The said gripper comprises two jaws 123 mounted on a head 124 for pivotal movement about pins 125.

The jaws 123 are controlled by two dogs 126 pivoted on the head 124 about pins 127. The dogs 126 act upon the jaw 123 by the intermediary of two adjustable screws 128 adapted to be locked by transverse set screws 129. The head 124 is carried by a tube 130 and an extractor 131 extends within this tube. Between a nut 133 screwed to the rear end of tube 130 and a shoulder portion 134 there is loaded a spring 132 for the extractor 131. The axial displacement of extractor 131 under the action of spring 132 is limited by an abutment ring 135 secured to the rear end of the extractor 131 and bearing against the nut 133 when the extractor 131 is unloaded. In the position shown in FIG. 6 the waste end of the bar 9 has pushed the extractor 131 to the left and the spring 132 is loaded.

The tube 130 extends within a helical screw 136 provided at its forward end with a camming surface 137 for the dogs 126. The screw 136 in turn is mounted in three bearings 138, 139, 140 of the support 141 similar to the support 95 of the first embodiment and secured to the frame 1 of the lathe in front of the headstock 2 and of the sleeve 39 of the lathe. As in the first embodiment described, axial displacements of the screw 136 are controlled by a wheel 142 axially held between the bearings 138 and 139 of the support 141.

In the position represented in FIG. 6, the extractor for the waste end of the bar 9 has been advanced in seizing position and the jaws 123 are already closed on the remnant of bar 9. In its rest position screw 136 is positioned on the left and the head 124 lies between the bearings 139 and 140 of the support 141. Moreover, the camming surface 137 does not engage the dogs 126 but is spaced apart therefrom so that the jaws 123 of the gripper are separated from each other by springs 143 anchored, on the one hand, at the head 124, and, on the other hand, at the jaws 123.

When the motor actuating wheel 142 is started as has been described in the first embodiment, the helical screw 136 which then is in its rest position, is moved to the right until it has reached the position of FIG. 6. Tube 130 carrying head 124 follows this movement until an abutment ring 144 secured to the rear end of tube 130 abuts an adjustable nut 145 secured to the bearing 138 of support 141. The nut 145, which may be locked by a set screw 146, is adjusted so as to stop tube 130 at a moment where the jaws 123 have reached an axial position in which they are ready to seize the forward end of the waste end of bar 9. Before the extractor reaches this position, the bar remnant which protrudes from sleeve 39 loads the extractor 131. The motor actuating wheel 142 continues to rotate in the same direction for a short period after ring 144 has reached nut 145. In the course of this last phase the helical screw 136 moves alone in direction towards the end of the bar remnant to be evacuated so that the camming surface 137 engages the dogs 126 and produces the closure of the jaws 123 on the end of the bar remnant to be evacuated. When the camming surface 137 has reached the position represented in FIG. 6, an element (not shown) of the helical screw 136 actuates the switch of the motor driving wheel 142 so as to reverse the direction of rotation of this motor. From this moment on, the helical screw 136 moves to the left from the position shown in FIG. 6 and the tube 130 follows this movement owing to frictional engagement. Thus, the jaws 123 extract the waste end of bar 9 first from the chuck 8 of the headstock 2 and then from the sleeve 139. Screw 136 and tube 130 are displaced toward the left in FIG. 6 until head 124 abuts a ring 147 secured to the bearing 139 of support 141. At this moment the backward movement of tube 130 is stopped and wheel 142 continues to drive the screw 136 alone. Before screw 136 actuates again the reverse switch of the motor driving wheel 142 and stops this motor, it moves backward alone through a distance sufficient to liberate its camming surface 137 from the dogs 126. Thereby the opening of the jaws 123 at the end of the return stroke of screw 136 is ascertained. As soon as the springs 143 have opened the jaws 123, the extractor 131 liberates the bar remnant from the jaws and this remnant may be evacuated through a chute (not shown) placed in front of the bearing 140 of support 141.

As to the introduction of a new stock bar, this is effected as described with respect to the first embodiment.

It appears also from FIG. 6 that the remnant of bar 9 to be evacuated has been advanced somewhat after tool 50 has carried out its severing operation on the last workpiece machined from the bar. To obtain this last advance of the bar, which makes the latter accessible to the jaws 123, it suffices to place the contact 78 (FIG. 1) which releases all operations of the feeding device at an appropriate place with respect to the chain wheel 57 so that the pusher 51 still advances the bar 9 when the member 59 of chain 55 turns around wheel 57.

While an entirely electrical control mechanism has been described in detail to ascertain the feeding of the lathe, any person skilled in the art will be able to provide a similar device partly or entirely controlled hydraulically, pneumatically, electronically, or mechanically for the sequence of the following operations:

Stopping of the operations of the lathe at a moment of the cycle where no tool is engaged in the path of the stock bar and opening of the chuck of the headstock, actuating the extracting member; shortly starting again the operations of the lathe up to the end of the commenced cycle and starting definitively this operation when the loader has brought into place a new stock bar.

Further changes in the sizes, shape and arrangement of parts will still appear obvious to those skilled in the art within the scope of the appended claims.

I claim:

1. A lathe including a reciprocably slidable headstock, a toolholder axially forward of said headstock, and a guide sleeve adjacent to said toolholder for guiding and supporting a stock bar, said headstock providing an axial opening for the passage of a stock bar through opposite ends of said headstock, a feeding means for feeding an elongated stock bar forwardly through said headstock opening, and an extractor means located forwardly of said guide sleeve for extracting a stock bar remnant from said headstock opening, said extractor means including an extractor member which is axially reciprocable in axial alignment with said headstock opening, said member being axially reciprocable independently of said feeding mans and relative thereto.

2. The lathe of claim 1, wherein said reciprocable extractor member includes a means for urging a remnant piece through said headstock and through said guide sleeve in accordance with a reciprocating movement of said extractor member.

3. The lathe of claim 1, including a resilient loading means urging said extractor member in a first axial direction, a drive means for displacing said extractor member in the opposite axial direction against the urging of said loading means to thereby cock said extractor member, a latch means to hold said extractor member in cocked position and a latch release means to free said extractor member whereby said member may be propelled from said cocked position and in said first axial direction, said extractor member comprising an end portion which is adapted to strike against an end of a remnant piece located in said headstock and guide sleeve when said member is propelled in said first axial direction.

4. The lathe of claim 1, wherein said feeding means comprises a pusher member which is adapted to perform respective forward and backward strokes and to feed a stock bar through said headstock opening during said forward stroke, said lathe including a control camshaft operatively connected with respective machining tools on said tool holder for moving said tools transversely to the axial direction of said headstock opening, said extractor means including a drive means drivingly connected to said extractor member, an automatic control means for actuating said drive means and said camshaft, said control means including a first actuator device which is operative for stopping said camshaft in correspondence to said feeding means pusher member being substantially at the end of its forward stroke and also in correspondence to camshaft being in a position whereby it has displaced all tools on said tool holder away from the axial direction of said headstock opening, a second actuator device which is operative for starting said drive means in correspondence to said pusher member having begun its rearward stroke and in correspondence to said camshaft being stopped, said second device also stopping said drive means in correspondence to said drive means having driven said extractor member through a full reciprocating movement thereof, a third actuator device which is operative for starting said camshaft in correspondence to said drive means being stopped and in correspondence to said pusher member being proximate to the end of its rearward stroke, a fourth actuator device which is operative for stopping said camshaft in correspondence to said camshaft being in a position whereby it has displaced a tool on said tool holder to a position traversing the axial direction of said headstock opening, a fifth actuator device which is operative for starting said camshaft in correspondence to said pusher member being at a predetermined position in its forward stroke.

References Cited by the Examiner
UNITED STATES PATENTS 2,746,128  5/1956  Barron et al. _____ 214—1.2 X
3,131,587  5/1964  Spohn et al. _____ 82—2.7

FOREIGN PATENTS 1,233,780  5/1960  France.
917,158  11/1963  Great Britain.

WILLIAM W. DYER, JR., Primary Examiner.

DONALD R. SCHRAN, Examiner.

L. VLACHOS, Assistant Examiner.